United States Patent
Anton

(10) Patent No.: US 9,249,325 B2
(45) Date of Patent: Feb. 2, 2016

(54) AQUEOUS INK-JET INKS FOR IMPROVED ADHESION TO PRINT SUBSTRATES

(75) Inventor: Waifong Liew Anton, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 11 days.

(21) Appl. No.: 13/980,381

(22) PCT Filed: Mar. 15, 2012

(86) PCT No.: PCT/US2012/029311
§ 371 (c)(1),
(2), (4) Date: Jul. 18, 2013

(87) PCT Pub. No.: WO2012/125879
PCT Pub. Date: Sep. 20, 2012

(65) Prior Publication Data
US 2013/0293644 A1 Nov. 7, 2013

Related U.S. Application Data

(60) Provisional application No. 61/452,720, filed on Mar. 15, 2011.

(51) Int. Cl.
| | | |
|---|---|---|
| C09D 11/36 | (2014.01) |
| C09D 11/322 | (2014.01) |
| C09D 11/324 | (2014.01) |
| C09D 11/38 | (2014.01) |
| B41J 2/21 | (2006.01) |

(52) U.S. Cl.
CPC .............. *C09D 11/36* (2013.01); *B41J 2/2107* (2013.01); *C09D 11/322* (2013.01); *C09D 11/324* (2013.01); *C09D 11/38* (2013.01)

(58) Field of Classification Search
CPC .............................. C09D 11/30; C09D 11/322
USPC ............................................. 106/31.6, 31.86
See application file for complete search history.

(56) References Cited

U.S. PATENT DOCUMENTS

| | | | |
|---|---|---|---|
| 4,597,794 A | 7/1986 | Ohta et al. | |
| 5,022,592 A | 6/1991 | Zakheim et al. | |
| 5,026,427 A | 6/1991 | Mitchell et al. | |
| 5,085,698 A | 2/1992 | Ma et al. | |
| 5,165,968 A | 11/1992 | Johnson et al. | |
| 5,231,131 A | 7/1993 | Chu et al. | |
| 5,310,778 A | 5/1994 | Shor et al. | |
| 5,519,085 A | 5/1996 | Ma et al. | |
| 5,554,739 A | 9/1996 | Belmont | |
| 5,643,357 A * | 7/1997 | Breton et al. | 106/31.25 |
| 5,679,138 A | 10/1997 | Bishop et al. | |
| 5,891,231 A | 4/1999 | Guerlich et al. | |
| 5,976,232 A | 11/1999 | Gore | |
| 6,102,996 A * | 8/2000 | Parazak | 106/31.25 |
| 6,277,183 B1 | 8/2001 | Johnson et al. | |
| 6,306,204 B1* | 10/2001 | Lin | 106/31.43 |
| 6,852,156 B2 | 2/2005 | Yeh et al. | |
| 2002/0121220 A1* | 9/2002 | Lin | 106/31.27 |
| 2003/0079649 A1 | 5/2003 | Kelly-Rowley et al. | |
| 2003/0089277 A1 | 5/2003 | Zakheim et al. | |
| 2004/0077749 A1* | 4/2004 | Yatake | 523/160 |
| 2006/0264535 A1* | 11/2006 | Oyanagi et al. | 523/160 |
| 2007/0076071 A1 | 4/2007 | Iu et al. | |
| 2007/0248838 A1* | 10/2007 | De Saint-Romain | 428/608 |
| 2008/0257211 A1* | 10/2008 | Oriakhi | 106/31.65 |
| 2010/0279083 A1* | 11/2010 | Trummer et al. | 428/195.1 |
| 2011/0148978 A1* | 6/2011 | Akiyama et al. | 347/20 |
| 2012/0140005 A1* | 6/2012 | De Voeght et al. | 347/93 |

FOREIGN PATENT DOCUMENTS

| | | |
|---|---|---|
| EP | 0556649 A | 8/1993 |
| EP | 0851012 A2 | 7/1998 |
| EP | 1707603 A2 | 10/2006 |

OTHER PUBLICATIONS

PCT International Search Report for International application No. PCT/US2012/029311, dated Jun. 11, 2012.
High-Performance Solvents; BASF, The Chemical Company; www.basf.com/performance-materials.

* cited by examiner

*Primary Examiner* — Veronica F Faison
(74) *Attorney, Agent, or Firm* — Simon L. Xu

(57) ABSTRACT

The present disclosure provides novel aqueous ink jet inks containing an aqueous vehicle, a colorant, a first organic co-solvent and a second organic co-solvent. Said ink jet inks demonstrate improved adhesion to print substrates.

16 Claims, No Drawings

AQUEOUS INK-JET INKS FOR IMPROVED ADHESION TO PRINT SUBSTRATES

BACKGROUND OF THE DISCLOSURE

This disclosure relates to novel aqueous ink-jet inks containing an aqueous vehicle, a colorant, a first organic co-solvent and a second organic co-solvent for improving ink adhesion to print substrates. Also disclosed is a printing method using these inks.

Inkjet recording is a printing method wherein droplets of ink are ejected through fine nozzles to form letters or figures on the surface of recording media. Inks used in such recording are subject to rigorous demands including, for example, good dispersion stability, ejection stability, and good fixation to media.

Aqueous dispersions of pigment particles are widely used in ink-jet printing. Because a pigment is typically not soluble in an aqueous vehicle, it is often required to use a dispersing agent, such as a polymeric dispersant or a surfactant, to produce a stable dispersion of the pigment in the aqueous vehicle. More recently, so-called "self-dispersible" or "self-dispersing" pigments (hereafter "SDP(s)") have been developed. As the name would imply, SDPs are dispersible in water without dispersants.

The main advantage of inkjet printers over laser printers includes low cost and simplicity. However, many commonly formulated inkjet ink do not dry adequately when printed on hydrophobic media that have not been specially treated to accept water-based inks, consequently resulting in poor image quality. Hydrophobic media include resin-coated papers such as those used for conventional printing, transparency films made of acetate and untreated vinyls. However, treatment of hydrophobic media to accept water-based inks causes increases to both printing costs and processing time.

U.S. Pat. No. 5,165,968 discloses water-based inks containing a small amount of lower alkyl alcohol(s) or benzyl alcohol to decrease dry time and improve smear resistance of printed image.

U.S. Pat. No. 6,277,183 discloses aqueous inkjet inks containing a long chain alcohol having at least 8 carbons to reduce mottle and halo of printed images.

U.S. Patent Application Publication No. 2003/0079649 discloses aqueous black inks containing one 1,2-diol, a mono- or di-hydric alcohol for printing on glossy media with increased dot size and reliability.

A need exists for an inkjet ink that can be printed on hydrophobic media to provide a high quality image without having to pre-treat the surface of the media or using a large amount of water-soluble solvents that can lead to degradation and/or delamination of pen components. The present disclosure satisfies this need by providing ink compositions having a desirable balance of organic co-solvents for both wetting the media and aiding the penetration of inks into the media for drying while maintaining the stability of the inks, good pen firing and material compatibility.

SUMMARY OF THE DISCLOSURE

An embodiment of the disclosure provides an aqueous ink-jet ink comprising an aqueous vehicle, a colorant, a first organic co-solvent and a second organic co-solvent, wherein:
  i) the aqueous vehicle contains water in an amount greater than 20% of the total weight of the ink;
  ii) the first organic co-solvent has a solubility of less than 4 g per 100 g of water and is used at an amount greater than its solubility in water at ambient temperature and pressure; and
  iii) the second organic co-solvent has a solubility of greater than 5 g per 100 g of water and is used at an amount sufficient to dissolve the first organic co-solvent in water at ambient temperature and pressure.

Another embodiment provides that the first organic co-solvent is one or more members selected from the group consisting of 1-dodecanol, 1-octanol, 1-hexanol, 1-pentanol and neopentyl alcohol.

Another embodiment provides that the second organic co-solvent is one or more members selected from the group consisting of 1,2-hexanediol, 1,6-hexanediol, tetraethylene glyclol dimethyl ether (also known as tetraglyme) and propylene glycol mono-methyl ether.

Another embodiment provides that the colorant is a carbon black.

Another embodiment provides that the colorant is a self-dispersed pigment.

Another embodiment provides that the ink jet ink further comprises a dispersant to disperse the colorant.

Another embodiment provides that the dispersant is an acrylic polymer.

Another embodiment provides that the dispersant is polyurethane.

Another embodiment provides that the ink jet ink further comprises a cross-linking agent to cross-link with the dispersant.

Another embodiment provides that the colorant is encapsulated by a polymer.

Another embodiment provides that the aqueous ink jet ink further comprises a binder.

Another embodiment provides that the aqueous ink jet ink is printed on vinyl.

Another embodiment provides that the aqueous ink jet ink is printed on textiles.

Another embodiment provides that the aqueous ink jet ink is printed on offset media.

Another embodiment provides that the aqueous ink jet ink is printed on plain paper.

Another embodiment provide an aqueous ink-jet ink consisting of an aqueous vehicle, a colorant, a first organic co-solvent and a second organic co-solvent, wherein the colorant is encapsulated by a polymer, and wherein:
  i) the aqueous vehicle contains water in an amount greater than 20% of the total weight of the ink;
  ii) the first organic co-solvent has a solubility of less than 4 g per 100 g of water and is used at an amount greater than its solubility in water at ambient temperature and pressure; and
  iii) the second organic co-solvent has a solubility of greater than 5 g per 100 g of water and is used at an amount sufficient to dissolve the first organic co-solvent in water at ambient temperature and pressure.

Another embodiment provides an aqueous ink-jet ink consisting of an aqueous vehicle, a colorant, a first organic co-solvent, a second organic co-solvent, a dispersant and a cross-linking agent to cross-link with the dispersant, wherein:
  i) the aqueous vehicle contains water in an amount greater than 20% of the total weight of the ink;
  ii) the first organic co-solvent has a solubility of less than 4 g per 100 g of water and is used at an amount greater than its solubility in water at ambient temperature and pressure; and iii) the second organic co-solvent has a solubility of greater than 5 g per 100 g of water and is used at an amount sufficient to dissolve the first organic co-solvent in water at ambient temperature and pressure.

Yet another embodiment provides a method of ink-jet printing onto a substrate comprising, in any workable order, the steps of:
  a) providing an ink-jet printer that is responsive to digital data signals;
  b) loading the printer with a substrate to be printed;
  c) loading the printer with an aqueous ink-jet ink comprising an aqueous vehicle, a colorant, a first organic co-solvent and a second organic co-solvent, wherein:
    i) the aqueous vehicle contains water in an amount greater than 20% of the total weight of the ink;
    ii) the first organic co-solvent has a solubility of less than 4 g per 100 g of water and is used at an amount greater than its solubility in water at ambient temperature and pressure; and
    iii) the second organic co-solvent has a solubility of greater than 5 g per 100 g of water and is used at an amount sufficient to dissolve the first organic co-solvent in water at ambient temperature and pressure.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "OD" means optical density.

As used herein, the term "aqueous vehicle" refers to water or a mixture of water and at least one water-soluble, or partially water-soluble, organic solvent (co-solvent).

As used herein, the term "D50" means the volume particle diameter of the 50th percentile (median) of the distribution of particle sizes.

As used herein, Glycereth 26 is the polyethylene glycol ether of Glycerin with an average ethoxylation value of 26.

As used herein, Denacol® 321 is trimethylolpropane polyglycidyl ether, a cross-linking reagent from Nagase Chemicals Ltd., Osaka, Japan.

As used herein, the term "encapsulation" means to encase a pigment in a polymeric system resulting from the polymerization of monomers in the presence of a pigment which is dispersed with a polymeric dispersant.

As used herein, the term "binder" means a film forming ingredient in the ink jet ink. A binder is normally added when an ink is formulated.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Ink Vehicle

The pigmented ink of this disclosure comprises an ink vehicle typically an aqueous ink vehicle, also known as aqueous vehicle or aqueous carrier medium, the aqueous dispersion and optionally other ingredients.

The ink vehicle is the liquid carrier (or medium) for the aqueous dispersion(s) and optional additives. The term "aqueous vehicle" refers to a vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; and lower alkyl ethers of polyhydric alcohols.

The amount of ink vehicle in the ink is typically in the range of from 70% to 99.8%, and more typically from 80% to 99.8%, by weight based on total weight of the ink.

The ink vehicle can be made to be fast penetrating (rapid drying) by including surfactants. Suitable surfactants include ethoxylated acetylene diols (e.g. Surfynol® series commercially available from Air Products), ethoxylated alkyl primary alcohols (e.g. Neodol® series commercially available from Shell) and secondary alcohols (e.g. Tergitol® series commercially available from Union Carbide), sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of surfactants added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Organic Co-Solvents

It was surprisingly found that including a first organic co-solvent having a solubility of less than 4 g per 100 g of water together with a second organic co-solvent having a solubility of greater than 5 g per 100 g of water in the ink composition can balance the need to wetting the print media and allowing the rapid penetration of the bulk of the liquid in the ink into the media for drying. Typically, the first organic co-solvent is used at an amount greater than its solubility in water at ambient temperature and pressure, and the second organic co-solvent is used at an amount sufficient to dissolve the first organic co-solvent. The proper balance of the first and second organic co-solvents can contribute to stabilizing pigment dispersions, good pen firing property and material compatibility. Typically, the first organic co-solvent is one or more members selected from the group consisting of 1-dodecanol, 1-octanol, 1-hexanol, 1-pentanol and neopentyl alcohol, and the second organic co-solvent is one or more members selected from the group consisting of 1,2-hexanediol, 1,6-hexanediol, tetraethylene glycolol dimethyl ether (also known as tetraglyme) and propylene glycol mono-methyl ether.

Colorant

As prescribed by the present disclosure, the colorant comprises pigment. Raw pigment is insoluble and non-dispersible in the ink vehicle and must be treated in order to form a stable dispersion. "A stable dispersion" means that the pigment is finely divided, uniformly distributed and resistant to particle growth and flocculation.

Treatment of a pigment with a dispersant can stabilize the pigment by forming a dispersion. The term "dispersant" as used herein is generally synonymous with the terms "dispersing agent" and "suspending agent" which are also found in the art.

A dispersion is prepared by premixing a pigment and a dispersant, followed by dispersing or deflocculating the mixture in a milling step. The premixture includes an aqueous carrier medium (such as water and, optionally, a water-miscible solvent) when the milling step involves a wet milling operation. The milling step may be accomplished in a t-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the dispersant and the pigment under pressure. The media for the media mill is chosen from commonly available media, including zirconia, YTZ® (Nikkato Corporation, Osaka, Japan), and nylon. These various dispersion processes are in a general sense well-known in the art, as exemplified by U.S. Pat. Nos. 5,022,592; 5,026,427; 5,310,778; 5,891,231; 5,679,138 and 5,976,232, and U.S. Patent Publication No. 2003/0089277. The pigment dispersion is typically made in a concentrated form (dispersion concentrate), which is subsequently diluted with a suitable liquid containing the desired additives to form the final ink.

It may also be possible to make one or more of the pigments into a so-called self-dispersing pigment. The term self-dispersing pigment ("SDP") refers to pigment particles whose surface has been chemically modified with hydrophilic dispersibility-imparting groups that allow stable dispersion in an aqueous vehicle without a separate dispersant. The hydrophilic dispersibility-imparting surface groups are typically ionizable.

An SDP may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. No. 5,554,739 and U.S. Pat. No. 6,852,156.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and $ZnO$; and black pigment carbon black. The pigment names and abbreviations used herein are the "C.I." designation for pigments established by Society of Dyers and Colourists, Bradford, Yorkshire, UK and published in *The Color Index*, Third Edition, 1971.

The range of useful particle size after dispersion is typically from about 0.005 um to about 15 um. Typically, the pigment particle size should range from about 0.005 um to about 5 um; and, specifically, from about 0.005 um to about 1 um. The average particle size as measured by dynamic light scattering is less than about 500 nm, typically less than about 300 nm.

Colorant species other than the prescribed pigments may be present in the ink, or the ink colorant may consist essentially of only the prescribed pigments.

The amount of colorant present in the ink is typically in the range of from about 0.1% to about 10% by weight, and more typically in the range of from about 0.5% to about 8% by weight, based on the total weight of ink.

Dispersant

A wide variety of dispersants can be used in the present disclosure. Suitable dispersants include polymeric dispersants such as acrylic, styrenic, polyurethane, and polyester, etc. The dispersant can be an anonic, cationic, or non-ionic stabilizing species. Both ionic and steric forms of stabilization can be employed. The dispersant can be designed to be used in an aqueous system or in a solvent based system. In an aqueous system, the dispersant can be used at low pH as well as at high pH depending on the specific design.

The polymeric dispersant used to stabilize the pigment particle is typically either a structured polymer or a random polymer. The use of random polymers for dispersing pigments for ink-jet inks was described in U.S. Pat. No. 4,597,794. The term "structured polymer" means polymers having a block, branched or graft structure. Examples of structured polymers include AB or BAB block copolymers as disclosed in U.S. Pat. No. 5,085,698; ABC block copolymers as disclosed in EP-A-0556649; and graft copolymer. The graft copolymer typically has a weight average molecular weight of from about 4,000 to about 100,000, and more typically from about 10,000 to about 40,000. Mixtures of more than one graft copolymer can also be used. The graft copolymer comprises from about 90% to about 50% by weight of a polymeric backbone and, correspondingly, from about 10% to about 50% by weight of polymeric side chains (arms) attached to the backbone. Typically, the polymeric backbone is a hydrophobic (relative to the side chains) adsorbing segment, and the side chains contain hydrophilic stabilizing macromonomers from the polymerization of ethylenically unsaturated "hydrophilic" monomers, such as ethylenically unsaturated monomers containing an acid group or a nonionic hydrophilic group. Alternatively, the polymeric backbone can be hydrophilic and the side chains hydrophobic. The side chains are attached to the backbone at a single terminal point. For a leading reference on graft copolymers, see: U.S. Pat. No. 5,231,131.

The ratio of pigment to dispersant is typically from 5:1 to 1:10. More typically, this ratio of pigment to dispersant is from 2:1 to 1:10.

Particularly suitable for the present disclosure ion are polymeric dispersants containing cross-linkable moieties that can react with a cross-linking agent after the dispersant is adsorbed onto the pigment surface. The cross-linkable moieties, upon reacting with a cross-linking agent, provide a cross-linked pigment dispersion. Typical parings of cross-linkable moiety and cross-linking agent are listed in the table below.

| Cross-linkable Moieties | Cross-linking Agent |
|---|---|
| COOH, SO$_3$H | Epoxide, Carbodiimide, Oxazoline, N-Methyol |
| Hydroxyl | Epoxide, Silane, Isocyanate, N-Methyol |
| Amino | Epoxide, Carbodiimide, Oxazoline, N-Methyol |

The mole ratio of the cross-linkable moiety on dispersant to the cross-linking agent is from 15:1 to 1:15, typically from 9:1 to 1:1.1, and more typically from 8:1 to 1:1. In calculating the mole ratio, all cross-linkable moieties on the dispersant and all cross-linking group on the cross-linking agent are included.

Preparation of Pigment Dispersion

The pigmented dispersions used in this disclosure can be prepared using any conventional milling process known in the art. Most milling processes use a two-step process involving a first mixing step followed by a second grinding step. The first step comprises mixing of all the ingredients, that is, pigment, dispersants, liquid carriers, neutralizing agent and any optional additives to provide a blended "premix". Typically all liquid ingredients are added first, followed by the dispersants, and lastly the pigment. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes.

The second step comprises grinding of the premix to produce a pigmented dispersion. Typically, grinding involves a media milling process, although other milling techniques can also be used. In the present disclosure, a lab-scale Eiger Minimill (Model M250, VSE EXP) manufactured by Eiger Machinery Inc., Chicago, Ill. is employed. Grinding was accomplished by charging about 820 grams of 0.5 YTZ® zirconia media to the mill. The mill disk is operated at a speed between 2000 rpm and 4000 rpm, and typically between 3000 rpm and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present disclosure are subjected to a total of 4 hours of milling.

For black dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Preparation of Cross-Linked Pigment Dispersion

In the cross-linking step, a cross-linking agent is mixed with the pigmented dispersions prepared above at room temperature or elevated temperature for a period from 6 h to 8 h. To facilitate the cross-linking reaction, it may be desirable to add a catalyst. Useful catalysts can be those that are either soluble or insoluble in the liquid and can be selected depending upon the crosslinking reactions. Some suitable catalysts include dibutyltin dilaurate, tributyl amine and dimethyl-dodecyl amine. After the cross-linking reaction is completed, the pH of the cross-linked dispersion can be adjusted to at least about 8.0, more typically to between 8.0 and 12.0, and most typically between 8.0 and 11.0, if needed. Optionally, the dispersion may be further processed using conventional filtration procedures known in the art. The dispersions may be processed using ultrafiltration techniques that remove co-solvents and other contaminants, ions or impurities from the dispersion. Each dispersion can be then tested for pH, conductivity, viscosity and particle size. Dispersion stability is deemed important to demonstrating the utility of the dispersant employed.

Encapsulation of Pigments

A polymerization process is employed to introduce polymer onto the pigment surface. Monomers are turned into small droplets and distributed onto the pigment surface typically under sonication condition. The monomers then polymerize to form a polymer coating the pigment surface. Suitable monomers include vinyl based monomers such as acrylates, methacrylates, vinyl ethers, styrenes, maleic anhydrides, etc. The polymerization process may include free radical processes using initiators such as Vazo® and peroxide initiators. The polymerization process can also include using redox types of initiations and approaches such as radical addition fragmentation technology (RAFT), group transfer polymerization and anionic polymerization, etc.

The amount of the monomers is such to result in a ratio of pigment particles to polymers from the polymerization of monomers in a range from 10:1 to 1:10. Typically this ratio of pigment particles to polymers is from 5:1 to 1:10. More typically, this ratio of pigment particles to polymers is from 2:1 to 10:1.

The monomers may also include cross-linking agents, i.e., functional groups that can be cross-linked to form a polymer network. Crosslinking is achieved by copolymerizing one or more polyfunctional monomers or by post-reacting functional groups on the polymer. Suitable polyfunctional monomers containing cross-linking agents include monomers such as ethyleneglycol dimethacrylate, diethyleneglycol dimethacrylate, triethyleneglycol dimethacrylate, tetraethyleneglycol dimethacrylate, polyethyleneglycol dimethacrylate, ethyleneglycol diacrylate, diethyleneglycol diacrylate, triethyleneglycol diacrylate, tetraethyleneglycol diacrylate, polyethyleneglycol diacrylate, trimethylol propane trimethacrylate, trimethylol propane triacrylate, divinylbenzene, propyleneglycol dimethacrylate, dipropyleneglycol dimethacrylate, propyleneglycol diacrylate, and dipropyleneglycol diacrylate, etc.

The amount of cross-linking agent typically ranges from 0.05% to 20%, by weight based on the total weight of the monomers. More typically the amount of cross-linking agent ranges from 0.1% to 10%, by weight based on the total weight of the monomers. Even more typically, the amount of cross-linking agent ranges from 0.25% to 2%, by weight based on the total weight of the monomers.

Alternatively, the encapsulated cross-linked pigment dispersion of the present disclosure can be prepared by adding a pre-formed polymer during the dispersion process as described in above to deposit it onto the pigment surface. The pre-formed polymer typically has cross-linkable moieties that can react with a cross-linking agent after the pre-formed polymer is adsorbed onto the pigment surface. The cross-linkable moieties, upon reacting with a cross-linking agent, provide a cross-linked encapsulated pigment dispersion.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the "Ink Vehicle" section above. Surfactants are typically used in amounts up to about 5% and more typically in amounts up to 2%, by weight based on the total weight of the ink.

Inclusion of sequestering (or chelating) agents such as ethylenediaminetetraacetic acid, iminodiacetic acid, ethylenediamine-di(o-hydroxyphenylacetic acid), nitrilotriacetic acid, dihydroxyethylglycine, trans-1,2-cyclohexanediaminetetraacetic acid, dethylenetriamine-N,N,N+,N'',N''-pentaacetic acid, and glycoletherdiamine-N,N,N',N'-tetraacetic acid, and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They can also be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Preferred classes of polymer additives include anionic acrylic, styrene-acrylic and polyurethane polymer.

When a soluble polymer is present, its level is typically between about 0.01% and about 10% by weight, based on the total weight of an ink. The upper limit is dictated by ink viscosity or other physical limitations.

Biocides may be used to inhibit growth of microorganisms.

Pigmented ink jet inks typically have a surface tension in the range of about 20 mN·m$^{-1}$ to about 60 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not to clog to a significant extent in an ink jet apparatus. Further, the ink should not corrode parts of the ink jet printing device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s.

The following examples illustrate the disclosed embodiments without, however, being limited thereto.

EXAMPLES

Preparation of Self-Dispersed Black Dispersion K-1

To a high speed disperser (HSD) vessel charged with 4250 grams of de-ionized water was added 750 grams of Nipex 160IQ pigment supplied by Evonik Degussa Corporation (Chester, Pa.). Ozone was fed into the bottom of the HSD vessel. To the mixture was added lithium hydroxide to increase the pH to 7 after five hours of ozone treatment. The mixture was then re-circulated through a Microfluidizer® for four hours, during which time lithium hydroxide was periodically added to maintain a pH between 6.5 and 7.5. The mixture was further purified by ultra-filtration to yield Dispersion K-1 as a carbon black pigment dispersion (12.9%) in water with an average D50 particle size of about 118 nm.

Preparation of Acrylic Dispersant Polymer 1

A 5-liter flask was dried with a heat gun under nitrogen purge and equipped with a mechanical stirrer, thermometer, nitrogen inlet, drying tube outlet, and addition funnels. To the flask were charged tetrahydrofuran (1500 g), followed by a catalyst, tetrabutyl ammonium m-chlorobenzoate (0.75 ml of a 1.0 M solution in acetonitrile). An initiator, 1,1-bis(trimethylsilyloxy)-2-methyl propene (24 g, 0.1 moles) was injected into the flask. Feed I containing tetrabutyl ammonium m-chlorobenzoate (0.4 ml of a 1.0 M solution in acetonitrile and tetrahydrofuran, 5 g) was started and added over a period of 180 minutes. Feed II containing trimethylsilyl methacrylate (300 g, 1.9 moles) and benzyl methacrylate was added to the reaction mixture over 60 minutes after Feed I was completed. The resulting mixture was heated to reflux, and tetrahydrofuran was removed by a distillation and replaced with sufficient amount of 2-pyrrolidone to provide a polymer solution containing 47% of solids in 2-pyrrolidone. The polymer was a random copolymer and had a composition of 49/20 benzyl methacrylate/methacrylic acid. The polymer was neutralized with potassium hydroxide (45.0% solids) to about pH 9, and diluted with de-ionized water to provide Polymer 1 containing 15% of nominal polymer solids.

Preparation of Magenta Pigment Dispersion M-1 with Acrylic Dispersant Polymer 1

To a HSD were charged Polymer 1 (167 g neutralized solution), de-ionized water (323 g) and magenta pigment R122 (75 g, supplied by Clariant). Mixing was conducted at a speed of 4000 rpm for 2 hrs. The mixture was then dispersed using a media mill for 4 hours. Dilution with de-ionized water followed by purification using ultrafiltration yielded Dispersion M-1 as a dispersion in water containing 15% of magenta pigment with a pigment to dispersant ratio of about 3.

Preparation of Magenta Pigment Dispersion M-2 with Acrylic Dispersant Polymer 1 and a Cross-Linking Agent Magenta Dispersion M-1 was mixed with a cross-linking agent, Denacol® 321, and heated to 60-80° C. for 8 hours. The amount of the cross-linking agent was such to allow for the reaction of about 40% of the acid groups on the dispersant. The mixture was diluted with de-ionized water and purified by ultrafiltration to yield Dispersion M-2 as a dispersion in water containing 13.1% of pigment solids.

Preparation of Yellow Pigment Dispersion Y-1 with Acrylic Dispersant Polymer 1 and a Cross-Linking Agent The dispersion was prepared in a similar manner as the preparation of Dispersion M-2 above, except by using a yellow pigment, Y74 (96 g, supplied by Sun Chemicals, Parsippany, N.J.) and a different amount (213 g) of Polymer 1. After dilution with de-ionized water and purification by ultrafiltration, Dispersion Y-1 was obtained as a dispersion in water with 14.6% of yellow pigment.

Preparation of Acrylic Dispersant Polymer 2

Polymer 2 was prepared in a manner similar to that for the preparation of Polymer 1, except with benzyl methacrylate (528 g, 3.0 moles), trimethylsilyl methacrylate (158 g, 1 mole), and ethoxy triethylene glycol methacrylate (197 g, 0.8 moles) to form a copolymer composition containing a first block of random copolymer portion of benzyl methacrylate and methyl acrylic acid, and a second block of ethyl triethylene glycol methacrylate, in 30/11//8 molar ratio of the respective monomers. The polymer was neutralized with potassium hydroxide (45.0% solids) to about pH 9, and diluted with de-ionized water to Provide Polymer 2 with 15% nominal polymer solids.

Preparation of Black Pigment Dispersion K-2 with Acrylic Dispersant Polymer 2 and a Cross-Linking Agent Dispersion K-2 was prepared as in Dispersion M-2, except by using carbon black pigment (100 g, Nipex 180IQ from Evonik Degussa Corporation, Chester, Pa.) and Polymer 2 (222 g). The mixture was heated together with a cross-linking agent, Denacol® 321, to between 60-80° C. for about 8 hours. The amount of the cross-linking agent was such to allow for the reaction of about 40% of the acid groups on the dispersant. The mixture was diluted with de-ionized water and purified by ultrafiltration to yield Dispersion K-2 as dispersion in water with 12.6% of black pigment. The pigment to dispersant ratio is about 3.

Preparation of Cyan Dispersion C-1 with Acrylic Dispersant Polymer 2 and a Cross-Linking Agent Dispersion C-1 was prepared as in Dispersion K-2, except by using a blue pigment, PB15 (Dainichiseika, Japan). Dispersion C-1 is a dispersion in water with 12.5% of cyan pigment.

Preparation of Acrylic Dispersant Polymer 3

The polymer was prepared in manner of Polymer 1 except with benzyl methacrylate (228.8 g, 1.30 moles) and trimethylsilyl methacrylate (158 g, 1 moles) to form a copolymer composition with a block of benzyl methacrylate and a block of methyl acrylic acid in 13//10 molar ratio of the respective monomers. The polymer was neutralized with potassium hydroxide (45.0% solids) to about pH 9, and diluted with de-ionized water to Provide Polymer 3 with 20% nominal polymer solids.

Preparation of Cross-linked Encapsulated Black Pigment Dispersion K-3 with Acrylic Dispersant Polymer 3

Using a procedure similar to the one described above for the preparation of Dispersion M-1, a base dispersion was prepared using carbon black pigment (100 g, Nipex 180IQ supplied by Evonik Degussa Corporation, Chester, Pa.), Polymer 3 (250 g) and de-ionized water. The mixture was dispersed for 4 hours using a media mill, and then diluted with de-ionized water and filtered to give a base dispersion in water with 15.5% of black pigment. The pigment to dispersant ratio is about 2.0.

To the above base dispersion (109.4 g) was added a monomer mixture consisting of ethyl triethylene glycol methacrylate (12.46 g), CD611 alkoxylated tetrahydrofurfuryl acrylate (2.26 g, Sartomer, Exton Pa.), CD802 alkoxylated diacrylate (1.69 g), Sartomer, Exton Pa.), and methoxy polyethyleneglycol methacrylate (MPEG 350, 0.51 g, supplied by Dow Chemicals, Michigan) and water (50.75 g). The mixture was agitated at high speed for 10 minutes while immersed in an ice-bath. The mixture was then sonicated for 15 minutes while cooling was maintained using an ice-bath. The mixture was then transferred to a 250-mL reactor flask and purged with nitrogen for 2 minutes. The temperature was raised to 82° C. before an initiator mixture consisting of Vazo® 68 WSP (8.0 g, 2.5%, supplied by DuPont Co., Wilmington, Del.) and aqueous potassium hydroxide (0.2 g, 45% solution) was added over 45 minutes. The mixture was allowed to polymerize for an additional 2 hours before cooling to room temperature and diluted with de-ionized water to yield Dispersion K-3 with a pigment concentration of 6%. Dispersion K-3 represented a dispersion containing pigment encapsulated in a cross-linked acrylic polymer with a ratio of pigment to total polymer contents of about 0.67.

Preparation of Acrylic Dispersant Polymer 4

Polymer 4 was a structured, block copolymer with methacrylic block, benzyl methacrylate block, and ethyltriethyleneglycol methacrylate block prepared in a manner similar to "Preparation 4" described in U.S. Pat. No. 5,519,085 which is incorporated by reference herein for all purposes as if fully set forth. The levels of monomers were adjusted to give a weight ratio of about 23//59//18 (or mole ratio of about 12//15//4) for this polymer. The polymer was neutralized with potassium hydroxide, and de-ionized water was added to yield Polymer-4 as a solution with a final polymer concentration of about 20% by weight.

Preparation of Black Pigment Dispersion K-4 with Acrylic Dispersant Polymer 4

Following a procedure similar to the one described above for the preparation of Dispersion M-1, a base dispersion was prepared using carbon black pigment (100 g, Nipex 180IQ supplied by Evonik Degussa Corporation, Chester, Pa.), Polymer 4 (200 g) and de-ionized water. The mixture was dispersed for 4 hours using a media mill, diluted with de-ionized water, and filtered to yield Polymer 4 as a dispersion in water containing 15.34% of black pigment. The pigment to dispersant ratio is about 2.5.

Preparation of Uncross-Linked Encapsulated Black Pigment Dispersion K-5

To Dispersion K-3 (138 g) was added a mixture of ethyl triethylene glycol methacrylate (9.53 g), methoxy polyethyleneglycol methacrylate (MPEG 350, 1.06 g, supplied by Dow Chemicals, Midland, Mich.), sodium laurel sulfate (0.092 g) and water (42.72 g). The resulting mixture was agitated at high speed for 10 minutes while immersed in an ice-bath. The mixture was then sonicated for 15 minutes while cooling was maintained in an ice-bath. The mixture was then transferred to a 250-mL reactor flask and purged with nitrogen for 2 minutes. The temperature was raised to 82° C., and an initiator mixture consisting of Vazo® 68 WSP (8.97 g, 2.5%, supplied by DuPont Co., Wilmington, Del.) and aqueous potassium hydroxide solution (0.2 g, 45%) was added over 45 minutes. The mixture was allowed to polymerize for an additional 2 hours before cooling to room temperature and diluted with de-ionized water to yield Dispersion K-5 with a pigment concentration of 10.5%. Dispersion K-5 represented a dispersion of pigment encapsulated in a non-cross-linked acrylic polymer with a ratio of pigment to total polymer contents of about 1.11.

Preparation of Acrylic Dispersant Polymer 5

Dispersant Polymer 5 was a structured, block copolymer with benzyl methacrylate block, and co-block of methacrylic acid and ethyltriethyleneglycol methacrylate. Polymer 5 was prepared in a manner similar to the preparation of Polymer 4, with the exception that the levels of monomers were adjusted to give the mole ratio of about 13//13/7.5 of benzyl methacrylate, methacrylic acid and ethyltriethyleneglycol methacrylate, respectively. The polymer was neutralized with potassium hydroxide and diluted with de-ionized water to yield Polymer 5 with a final polymer concentration of about 20% by weight.

Preparation of Black Pigment Dispersion K-6 with Acrylic Dispersant Polymer 5

Using a procedure similar to the one described above for the preparation of Dispersion M-1, a base dispersion was prepared using carbon black pigment (Nipex 180IQ, supplied by Evonik Degussa Corporation, Chester, Pa.), Polymer 5 and de-ionized water. The mixture was dispersed for 4 hours using a media mill. Dilution with de-ionized water follow by filtration yielded K-6 as a dispersion in water with 10.0% of a black pigment. The pigment to dispersant ratio is about 1.5.

Preparation of Polyurethane Binder 1

To a 2 L reactor were charged polytetramethylene ether glycol (Terathane T650®, 230 g, supplied by Invista, Wichita, Kans.), tetraethylene glycol dimethyl ether (205 g), and dimethylol proprionic acid (40 g). The mixture was heated to 115° C. under a nitrogen atmosphere for 60 minutes. The reaction mixture was subsequently cooled to 75° C. before isophorone diisocyanate (144 g) was added followed by tetraglyme (30 g) over a period of 60 minutes. The reaction was held at 90° C. for 9 hours. Addition of aqueous potassium hydroxide (45 g, 45%) and dilution with de-ionized water (925 g) yielded polyurethane Binder 1 with 25% of solids.

Preparation of Polyurethane Binder 2

Binder 2 was prepared in a manner similar to that of Binder 1, with the exception of using monomers Poly-G HQEE (from Arch Chemical, Norwalk, Conn.), dimethylol proprionic acid and meta-tetramethylene xylylene diisocyanate. Binder 2 has 25% of solids.

Print Substrates

Papers used for ink jet printing have typically included papers designed to have high absorptivity for aqueous ink or papers having water-receptive coated surfaces. These papers are functionally good for ink jet printing because the inks may be absorbed readily and therefore drying takes place quickly.

However, commercial offset coated papers are significantly different from office plain papers or photo/glossy papers specifically designed for ink-jet media. Typically, for commercial offset papers, the smooth non-porous surface is achieved by coating of a nonporous material and/or by a process of calendaring of the media which compacts the media and thus reduces its surface porosity. These papers require more time for aqueous fluids to penetrate than standard paper. Ink penetration into offset papers is a diffusion-type adsorption while ink penetration into standard office paper and many other specialty ink jet papers is typically a capillary-type absorption. Additionally, offset coatings contain special polymers, e.g., styrene-butadiene based polymer, that are much more hydrophobic than paper coatings specifically designed for ink-jet ink, e.g. water-soluble polymers such as polyvinyl alcohol. Thus, because offset coatings are typically hydrophobic, have poor penetration, and are smooth and nonporous, these papers tend to interact poorly with water-based inks, require long dry times and shows poor spreading characteristics and poor image quality.

Because commercial offset paper provides a smooth surface for printing and would provide a convenient and cost effective alternative to specialty papers, it would be useful to provide aqueous based ink-jet inks which can be used with commercial offset media. Such formulations would be particularly advantageous if they exhibited a reduction in ink dry out in ink jet nozzles. Additionally, these ink jet inks would also be desirable if they exhibited printing properties on offset media including excellent text and area fill, minimal coalescence in half tone images, excellent optical density and edge acuity, good water fastness, good smudge and rub resistance, and good light fastness.

Example 1

Organic Co-Solvents for Improved Drytime of Inks

Inks were prepared by combining all the ingredients shown in Table 1 and the organic co-solvents in the amount specified in Table 2. The mixtures were purified by filtering through a filter paper before evaluation. The inks thus obtained were filled into a HP45A pen and printed using an Hewlett Packard Deskjet 6122 printer.

TABLE 1

Ink Formulations

| Ingredient | Weight % |
| --- | --- |
| Dispersion K-1 | 13.5% |
| 2-Pyrrolidone | 4.0% |
| Propylene glycol mono-butyl ether | 0.6-6% |
| 1,2-Hexanediol | 14-18% |
| Nonionic surfactant | 0.3% |
| Additives shown in Table 2 | 2-3% |
| De-ionized water | Balance to 100% |

TABLE 2

Organic Co-Solvents for Inks in Table 1

| Ink | Organic Co-solvent, Weight % |
| --- | --- |
| Ink 1 | 1-Hexanol, 3% |
| Ink 2 | 1-Hexanol, 2% |
| Ink 3 | 1-Pentanol, 2% |
| Ink 4 | Neo-Pentyl Alcohol, 2% |
| Ink 5 | 1-Octanol, 2% |
| Ink 6 | 1-Dodecanol, 2% |
| CE-1 | None |
| CE-2 | n-Butanol, 2% |
| CE-3 | sec-Butanol, 2% |
| CE-4 | 3-Pentanol, 2% |
| CE-5 | Cyclohexanol, 2% |
| CE-6 | 1,2-Octanediol, 2% |
| CE-7 | Benzyl Alcohol, 2% |
| CE-8 | Cetyl Alcohol, 2% |
| CE-9 | Stearyl Alcohol, 2% |

Immediately upon ejection of printed image out of the printer, a sheet of unprinted dry office paper was put on top of the printed side of the test prints, and a weight (2.2 kg) was put on top. The weight was removed after 20 seconds, and the amount of ink transfer from the imaged test print onto the dry sheet was visually evaluated. The amount of ink transferred to the dry sheet was a measure of the drying rate of the ink on test substrates. The ink transfer was rated on a scale of 0 to 5 range, whereby a rating of "0" indicates little ink transfer (which indicates a fast drying ink) and rating of "5" indicates very heavy ink transfer (which indicates a slow drying ink).

The papers used for printing to illustrate the present disclosure are listed in Table 3 below, and print results are summarized in Table 4 below.

TABLE 3

Print Substrates

| Designation | Substrates |
| --- | --- |
| A | KROMCOTE ® Laser High Gloss (from Champion) |
| B | UTOPIA ® TWO, Dull (from Appleton Coated) |
| C | CAROLINA COVER ® (from International Paper) |
| D | LUSTRO ® Laser gloss (from Sappi Limited) |

TABLE 4

Results of Ink Transfer

| | Ink Transfer Rating on Substrates A-D | | | | Average on All 4 |
| --- | --- | --- | --- | --- | --- |
| Ink | A | B | C | D | Substrates |
| Ink 1 | 0.8 | 1.0 | 1.3 | 1.5 | 1.1 |
| Ink 2 | 0.7 | 1.3 | 1.0 | 2.3 | 1.3 |
| Ink 3 | 1.0 | 2.5 | 2.0 | 3.0 | 2.1 |
| Ink 4 | 2.5 | 2.5 | 1.0 | 3.5 | 2.4 |
| Ink 5 | 3.0 | 2.5 | 2.5 | 2.5 | 2.6 |
| Ink 6 | 3.0 | 3.0 | 2.5 | 3.0 | 2.9 |
| CE-1 | 2.8 | 3.0 | 3.3 | 3.3 | 3.0 |
| CE-2 | 3.0 | 3.5 | 2.5 | 3.5 | 3.1 |
| CE-3 | 3.0 | 4.0 | 3.5 | 4.0 | 3.6 |
| CE-4 | 4.0 | 4.5 | 3.5 | 4.5 | 4.1 |
| CE-5 | 4.0 | 4.0 | 4.5 | 4.0 | 4.1 |
| CE-6 | 4.0 | 4.5 | 4.5 | 4.5 | 4.4 |
| CE-7 | 4.5 | 4.5 | 4.5 | 4.5 | 4.5 |
| CE-8 | Incompatible Mixtures - phase separation | | | | |
| CE-9 | Incompatible Mixtures - phase separation | | | | |

Test results shown in Table 4 illustrated the advantageous effect of certain organic co-solvents such as hexanol, pentanol, neo-pentyl alcohol, octanol and dodecanol towards improving the drying rate of inks.

Example 2

Presence of a Binder Additive

Inks were prepared by combining all the ingredients shown in Table 5, the organic co-solvents and the binder additives in the amounts specified in Table 6. The mixtures were purified by filtering through a filter paper before evaluation. The inks were then filled into a HP45A pen and printed using a Hewlett Packard Deskjet 6122 ink-jet printer.

TABLE 5

Ink Formulations

| Ingredient | Weight % |
| --- | --- |
| Dispersion A | 13.5% |
| 2-Pyrrolidone | 4.0% |
| Propylene glycol mono-butyl ether | 0.6% |
| 1,2-Hexanediol | 14% |
| Nonionic surfactant | 0.3% |
| Additives shown in Table 6 | 2-3% |
| De-ionized water | Balance to 100% |

TABLE 6

Organic Co-Solvents and Binder for Inks in Table 5

| Ink | Organic Co-solvent, Weight % | Binder, Weight % |
|---|---|---|
| CE-1 | None | None |
| Ink 2 | 1-Hexanol, 2% | None |
| Ink 7 | 1-Hexanol, 2% | Binder 1, 5% |
| Ink 8 | 1-Hexanol, 2% | Binder 2, 5% |

About 24 hours after an image was printed, the durability of the image was measured by rubbing a dry piece of paper at a controlled force and velocity over the printed image. The amount of ink transferred to the dry sheet was a measure of durability of ink on test substrates.

The durability was rated on a scale of 0 to 5, whereby a rating of "0" indicates little ink transfer (which indicates a very durable image) and a rating of "5" indicates very heavy ink transfer.

TABLE 7

Results of Durability

| Ink | Ink Transfer Rating on Substrates A-D | | | | Average on All 4 Substrates |
|---|---|---|---|---|---|
| | A | B | C | D | |
| CE-1 | 3.0 | 2.0 | 3.0 | 4.0 | 3.0 |
| Ink 2 | 2.0 | 2.0 | 3.0 | 4.0 | 2.8 |
| Ink 7 | 0.5 | 1.5 | 1.5 | 2.5 | 1.5 |
| Ink 8 | 1.5 | 2.5 | 2.5 | 3.5 | 2.5 |

Test results shown in Table 7 illustrated the advantageous effect of addition of binders towards improving the durability of the printed inks on various substrates listed in Table 3.

Example 3

Stability of Inks with Different Dispersions

Inks were prepared by combining all the ingredients shown in Table 8, and the dispersions and binder additives in the amounts specified in Table 9. These inks were subjected to a cycle of freezing and heating. In this process, ink temperature was first raised to 70° C. and held at 70° C. for 4 hours, and then cooled to −40° C. and held at −40° C. for 4 hours. This cycling of temperature was repeated a total of five times. The average particle sizes of the inks before and after this stress test were measured. Stability of the average particle size was an indication of ink stability.

TABLE 8

Ink Formulations

| Ingredient | Weight % |
|---|---|
| 2-Pyrrolidone | 4.0% |
| Propylene glycol mono-butyl ether | 0.6% |
| 1-Hexanol | 3% |
| 1,2-Hexanediol | 14% |
| Nonionic surfactant | 0.3% |
| Dispersion and Binder shown in Table 9 | 20-27.9% |
| De-ionized water | Balance to 100% |

TABLE 9

Dispersion and Binder for Inks in Table 8

| Ink | Dispersion, Weight % | Binder, Weight % |
|---|---|---|
| CE-10 | Dispersion M-1, 20% | None |
| CE-11 | Dipsersion M-1, 20% | Binder 1, 5% |
| CE-12 | Dispersion K-4, 19.6% | None |
| Ink 10 | Dispersion K-1, 23.3% | None |
| Ink 11 | Dispersion M-2, 22.9% | None |
| Ink 12 | Dispersion M-2, 22.9% | Binder 1, 5% |
| Ink 13 | Dispersion Y-1, 20.5% | None |
| Ink 14 | Dispersion K-2, 23.8% | None |
| Ink 15 | Dispersion C-1, 24.0% | None |
| Ink 16 | Dispersion K-5, 25.7% | None |
| Ink 17 | Dispersion K-3, 50.0% | None |

Test results shown in Table 10 illustrated the advantageous results of using the inventive organic co-solvents in inks where the colorants are based on one or combination of following dispersions: self-dispersed pigment dispersions (Ink 10), polymerically-stabilized pigment dispersions whereby the polymeric dispersants were cross-linked to increase stability of these pigment dispersions (Inks 11-15), and polymerically-encapsulated pigment dispersions (Inks 16-17) whereby the higher molecular weight and quantity of polymers encapsulating the pigment also stabilizes the dispersions. As comparative examples, pigment dispersions dispersed by polymers that were not cross-linked or insufficiently high in molecular weight (CE-10 through CE-12) were more susceptible to desorption from the pigment surface by organic solvents and consequently resulted in phase separation of ink ingredients.

TABLE 10

Results of Stability

| Ink | Initial Average Particle Size (D50, nm) | Average Particle Size After Thermal Cycles (nm) |
|---|---|---|
| CE-10 | 99 | Phase separation of ink |
| CE-11 | 100 | Phase separation of ink |
| CE-12 | 110 | Phase separation of ink |
| Ink 10 | 104 | 98 |
| Ink 11 | 92 | 128 |
| Ink 12 | 324 | 336 |
| Ink 13 | 104 | 137 |
| Ink 14 | 117 | 143 |
| Ink 15 | 124 | 290 |
| Ink 16 | 127 | 131 |
| Ink 17 | 139 | 177 |

Example 4

Printing on Polyvinyl Chloride Film

Print substrate Arlon® DPF 4000 of 3.8 mil thick white vinyl with all-purpose adhesive was obtained from Arlon Graphics (Santa Ana, Calif.). The inks were printed out from a HP45A pen using a HP Deskjet 6122 printer.

About 24 hours after printing an image, the durability was measured by rubbing a dry piece of paper at a controlled force and velocity over the printed image. The amount of ink transferred to the dry sheet was a measure of durability of ink on the substrates tested.

The durability was rated on a scale of 0 to 5 range, whereby a rating of "0" indicates little ink transfer (very durable image) and a rating of "5" indicates very heavy ink transfer (poor image durability). Results summarized in Table 11 below showed a significant improvement in durability of images from inks containing the inventive organic co-solvents compared to the image from an ink composition without the organic co-solvent.

TABLE 11

Results of Durability of Image on Polymeric Vinyl Substrate

| Ink | Organic Co-solvent, Weight % | Durability |
|---|---|---|
| CE-1 | None | 4 |
| Ink 1 | 1-Hexanol, 3% | 2 |
| Ink 2 | 1-Hexanol, 2% | 2 |

Example 5

Printing on Textiles

Inks were prepared by combining all the ingredients shown in Table 12. The mixtures were purified by filtering through a filter paper before evaluation. The inks thus obtained were filled into the cartridge of an Epson 3000 ink jet printer and printed on a textile fabric that was temporarily affixed onto a paper backing.

TABLE 12

Ink Formulations for Printing on Textiles

| Ingredients | CE-13 | CE-14 | Ink 18 | Ink 19 |
|---|---|---|---|---|
| | | Weight (%) | | |
| Dispersion K-6 | 15 | 30 | 15 | 30 |
| 2-Pyrrolidone | — | — | 4.0 | 4.0 |
| Propylene glycol mono-butyl ether | 5 | 5 | 3 | 3 |
| Glycereth 26 | 6 | 6 | — | — |
| Glycerol | 26 | 26 | — | — |
| 1,2-Hexanediol | — | — | 15 | 15 |
| Anionic Surfactant | 0.25 | 0.25 | — | — |
| Nonionic Surfactant | 0.25 | 0.25 | 0.5 | 0.5 |
| 1-Hexanol | — | — | 3 | 3 |
| De-ionized water | Balance to 100 | Balance to 100 | Balance to 100 | Balance to 100 |

Results summarized in Table 13 below showed that the inventive Inks 18 and 19 provided improved image quality, as demonstrated by the higher optical density from the same amounts of pigmentation compared to inks (CE-13 and CE-14) not containing the inventive organic co-solvents.

TABLE 13

Results of Printing on Textiles

| | Optical Density | |
|---|---|---|
| Ink | 100% Cotton Blend | 60/40 Polyester/Cotton Blend |
| CE-13 | 0.78 | 0.85 |
| Ink 18 | 0.85 | 0.92 |
| CE-14 | 0.89 | 1.01 |
| Ink 19 | 0.94 | 1.05 |

What is claimed is:

1. An aqueous ink-jet ink for printing on a print substrate, comprising an aqueous vehicle, a colorant, a first organic co-solvent and a second organic co-solvent, wherein:
   i) said aqueous vehicle contains water in an amount greater than 20% of the total weight of the ink;
   ii) said first organic co-solvent has a solubility of less than 4 g per 100 g of water and is used at an amount greater than its solubility in water at ambient temperature and pressure, and said first organic co-solvent is one or more members selected from the group consisting of 1-dodecanol, 1-octanol, 1-hexanol, 1-pentanol and neopentyl alcohol;
   iii) said second organic co-solvent has a solubility of greater than 5 g per 100 g of water and is used at an amount sufficient to dissolve said first organic co-solvent in water at ambient temperature and pressure, and said second organic co-solvent is tetraethylene glycol dimethyl ether or 1,6-hexanediol, or mixture thereof;
   iv) said print substrate is selected from the group consisting of textile, vinyl and offset media; and
   v) said colorant is a carbon black or a self-dispersed pigment.

2. The ink of claim 1 wherein said ink-jet ink further comprises a dispersant to disperse said colorant.

3. The ink of claim 2, wherein said dispersant is an acrylic polymer.

4. The ink of claim 2, wherein said dispersant is polyurethane.

5. The ink of claim 2, wherein said inkjet ink further comprises a cross-linking agent to cross-link with said dispersant.

6. The ink of claim 1, wherein said colorant is encapsulated by a polymer.

7. The ink of claim 1, herein said aqueous inkjet ink further comprises a binder.

8. The ink of claim 1, wherein said print substrate is vinyl.

9. The ink of claim 1, wherein said print substrate is textiles.

10. The ink of claim 1, wherein said print substrate is offset media.

11. An aqueous inkjet ink consisting of an aqueous vehicle, a colorant, a first organic co-solvent and a second organic co-solvent, wherein said colorant is encapsulated by a polymer, and wherein:
   i) said aqueous vehicle contains water in an amount greater than 20% of the total weight of the ink;
   ii) said first organic co-solvent has a solubility of less than 4 g per 100 g of water and is used at an amount greater than its solubility in water at ambient temperature and pressure, and said first organic co-solvent is one or more members selected from the group consisting of 1-dodecanol, 1-octanol, 1-hexanol, 1-pentanol and neopentyl alcohol;
   iii) said second organic co-solvent has a solubility of greater than 5 g per 100 g of water and is used at an amount sufficient to dissolve said first organic co-solvent in water at ambient temperature and pressure, and said second organic co-solvent is tetraethylene glycol dimethyl ether or 1,6-hexanediol, or mixture thereof;
   iv) said print substrate is selected from the group consisting of textile, vinyl and offset media; and
   v) said colorant is a carbon black pigment.

12. An aqueous ink-jet ink for printing on a print substrate consisting of an aqueous vehicle, a colorant, a first organic co-solvent, a second organic co-solvent, a dispersant and a cross-linking agent to cross-link with said dispersant, wherein:
   i) said aqueous vehicle contains water in an amount greater than 20% of the total weight of the ink;
   ii) said first organic co-solvent has a solubility of less than 4 g per 100 g of water and is used at an amount greater than its solubility in water at ambient temperature and pressure;

iii) said second organic co-solvent has a solubility of greater than 5 g per 100 g of water and is used at an amount sufficient to dissolve said first organic co-solvent in water at ambient temperature and pressure, and said second organic co-solvent is tetraethylene glycol dimethyl ether or 1,6-hexanediol, or mixture thereof;

iv) said print substrate is selected from the group consisting of textile, vinyl and offset media; and v) said colorant is a carbon black or a self-dispersed pigment.

13. The ink of claim 12, wherein said first organic co-solvent is one or more members selected from the group consisting of 1-dodecanol, 1-octanol, 1-hexanol, 1-pentanol and neopentyl alcohol.

14. A method of ink-jet printing onto a substrate comprising, in any workable order, the steps of:
  a) providing an ink-jet printer that is responsive to digital data signals;
  b) loading the printer with a substrate to be printed;
  c) loading the printer with an aqueous ink-jet ink comprising an aqueous vehicle, a colorant, a first organic co-solvent and a second organic co-solvent, wherein:
    i) said aqueous vehicle contains water in an amount greater than 20% of the total weight of the ink;
    ii) said first organic co-solvent has a solubility of less than 4 g per 100 g of water and is used at an amount greater than its solubility in water at ambient temperature and pressure;
    iii) said second organic co-solvent has a solubility of greater than 5 g per 100 g of water and is used at an amount sufficient to dissolve said first organic co-solvent in water at ambient temperature and pressure, and said second organic co-solvent is tetraethylene glycol dimethyl ether or 1,6-hexanediol, or mixture thereof;
    iv) said print substrate is selected from the group consisting of textile, vinyl and offset media; and
    v) said colorant is a carbon black or a self-dispersed pigment.

15. The ink of claim 1, wherein said second organic co-solvent is tetraethylene glycol dimethyl ether.

16. The ink of claim 1, wherein said second organic co-solvent is 1,6-hexanediol.

* * * * *